United States Patent
Negishi et al.

(10) Patent No.: US 8,804,959 B2
(45) Date of Patent: Aug. 12, 2014

(54) COMMUNICATION DEVICE, COMMUNICATION METHOD, AND COMMUNICATION SYSTEM

(75) Inventors: Masaki Negishi, Tokyo (JP); Tetsuro Akaida, Kanagawa (JP)

(73) Assignee: Sony Corporation (JP)

( * ) Notice: Subject to any disclaimer, the term of this patent is extended or adjusted under 35 U.S.C. 154(b) by 390 days.

(21) Appl. No.: 13/151,827

(22) Filed: Jun. 2, 2011

(65) Prior Publication Data

US 2011/0305335 A1   Dec. 15, 2011

(30) Foreign Application Priority Data

Jun. 10, 2010   (JP) ................. P2010-133180

(51) Int. Cl.
*H04L 29/00* (2006.01)
(52) U.S. Cl.
USPC ............................ 380/255; 380/270; 340/5.8
(58) Field of Classification Search
USPC .................... 380/255, 270; 340/5.8
See application file for complete search history.

(56) References Cited

U.S. PATENT DOCUMENTS

| | | | |
|---|---|---|---|
| 6,842,106 B2* | 1/2005 | Hughes et al. ............ | 340/5.8 |
| 2004/0066278 A1 | 4/2004 | Hughes et al. | |
| 2005/0115800 A1 | 6/2005 | Dromard et al. | |
| 2009/0285400 A1 | 11/2009 | Kanemoto et al. | |

FOREIGN PATENT DOCUMENTS

| | | |
|---|---|---|
| JP | 1129379 | 5/1989 |
| JP | 3007399 | 1/1991 |
| JP | 10027225 | 1/1998 |
| JP | 2002279373 A | 9/2002 |
| JP | 2005529820 T | 10/2005 |
| JP | 2008269088 A | 11/2008 |
| JP | 2009276916 A | 11/2009 |
| WO | 2008018457 A1 | 2/2008 |

OTHER PUBLICATIONS

Office Action from Japanese Application No. 2010-133180, dated Jan. 7, 2014.

* cited by examiner

*Primary Examiner* — Brandon Hoffman
*Assistant Examiner* — Michael D Anderson
(74) *Attorney, Agent, or Firm* — Lerner, David, Littenberg, Krumholz & Mentlik, LLP

(57) ABSTRACT

Provided is a communication device including: a communication section performing proximity communication with a reader/writer; a storage section storing data and a sequence number; and a control section controlling the writing of the data to the storage section in accordance with a command from the reader/writer. The communication section sends the sequence number to the reader/writer and receives first encryption data, which is generated by the reader/writer using a value based on the sequence number and writing target data which is target data which is written into the storage section, and the writing target data from the reader/writer, and the control section generates second encryption data using the value based on the sequence number and the writing target data, writes the writing target data into the storage section, and updates the sequence number in a case where the first encryption data and the second encryption data match.

5 Claims, 9 Drawing Sheets

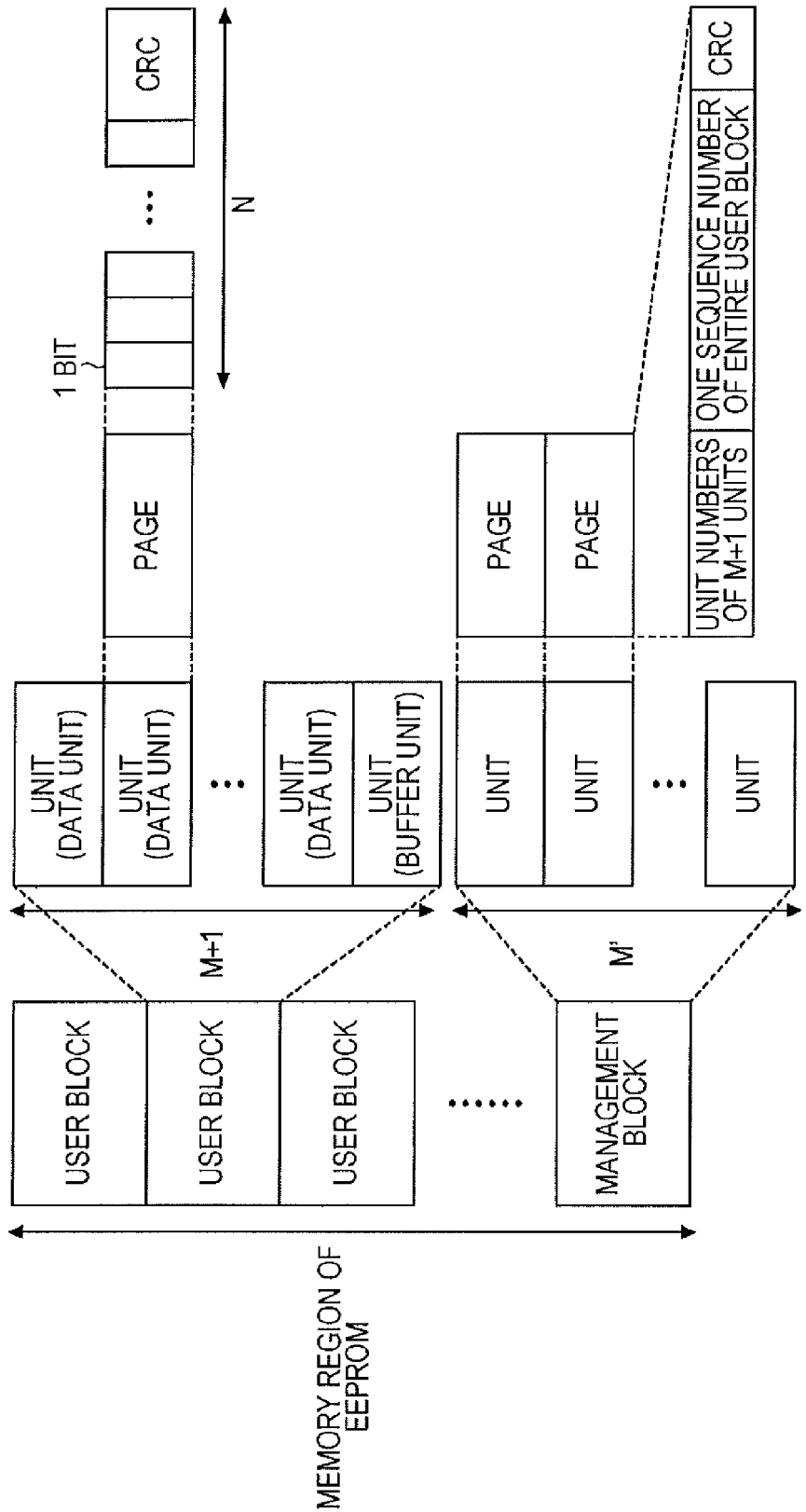

COMMUNICATION DEVICE, COMMUNICATION METHOD, AND COMMUNICATION SYSTEM

CROSS-REFERENCE TO RELATED APPLICATION

The present application claims priority from Japanese Patent Application No. JP 2010-133180 filed in the Japanese Patent Office on Jun. 10, 2010, the entire content of which is incorporated herein by reference.

BACKGROUND OF THE INVENTION

1. Field of the Invention

The present invention relates to a communication device, a communication method and a communication system, and in particular, to a communication device, a communication method and a communication system able to achieve a reduction in size and lowering of the costs of a wireless tag while ensuring security with regard to the wireless tag such as an IC card or an IC chip which performs, for example, proximity communication with a reader/writer.

2. Description of the Related Art

In recent years, proximity communication, where wireless communication is performed without contact at a close distance using IC (Integrated Circuit) cards or the like, is used for, for example, electronic commuter tickets, electronic money and the like, and also, mobile phone devices, which have an electronic commuter ticket or electronic money function using proximity communication, are in widespread use.

Proximity communication has been standardized as, for example, ISO/IEC 14443 or ISO/IEC 18092 (referred to below as NFC (Near Field Communication)).

Here, out of communication devices which perform proximity communication such as communication based on an NFC standard, a communication device such as an IC card or an IC chip, which performs proximity communication with a reader/writer, which outputs an RF (Radio frequency) signal, in a format of responding to the signal from a reader/writer, is referred to as a wireless tag.

For example, the wireless tag provides various types of services by having a non-volatile memory such as an EEPROM (Electrically Erasable Programmable Read Only Memory) built in, and performing reading and writing data, which is exchanged with the reader/writer using proximity communication, in the non-volatile memory.

In the reader/writer and wireless tag, to prevent tampering of data stored in the non-volatile memory which is built into the wireless tag by proximity communication being performed with a fraudulent device, mutual authentication is performed, for example, in accordance with a symmetrical cipher algorithm (for example, Japanese Unexamined Patent Application Publication No. 2009-276916).

In the mutual authentication in accordance with a symmetrical cipher algorithm, one out of the reader/writer and the wireless tag, for example, the reader/writer, generates a random number RA, and by encrypting the random number RA using a common key KA, encryption data {RA}KA of the random number RA is generated and sent to the wireless tag.

The wireless tag receives the encryption data {RA}KA from the reader/writer and decrypts the encryption data {RA}KA using the common key KA. Furthermore, by encrypting the decryption result RA' of the encryption data {RA}KA using a common key KB, encryption data {RA'}KB of the decryption result RA' is generated and sent to the reader/writer by the wireless tag.

The reader/writer receives the encryption data {RA'}KB from the wireless tag and decrypts the encryption data {RA'}KB using the common key KB. Then, the reader/writer performs authentication of whether or not the wireless tag is a legitimate device by comparing the decryption result RA" of the encryption data {RA'}KB and the random number RA.

That is, in a case where the decryption result RA" of the encryption data {RA'}KB and the random number RA match with each other, since the wireless tag has the common keys KA and KB, the reader/writer recognizes that the wireless tag is a legitimate device (authentication of the wireless tag is successful).

In addition, in the mutual authentication in accordance with a symmetrical cipher algorithm, the other out of the reader/writer and the wireless tag, for example, the wireless tag, generates a random number RB, and by performing processing in the same manner as the case below where the reader/writer authenticates the wireless tag, the wireless tag performs authentication of whether or not the reader/writer is a legitimate device.

Then, when the authentication of the reader/writer is successful in the wireless tag, in the reader/writer and the wireless tag, an encryption key is generated using the random numbers RA and RB, data is encrypted using the encryption key, and data exchange is performed.

Accordingly, between the reader/writer and the wireless tag where mutual authentication has been successful, since the encryption data obtained by encrypting the data using the encryption key is exchanged, it is possible to prevent eavesdropping of the data.

SUMMARY OF THE INVENTION

As above, in the case of performing mutual authentication between the reader/writer and the wireless tag in accordance with a symmetrical cipher algorithm, a circuit which generates random numbers (random number generating circuit) is necessary in both the reader/writer and the wireless tag.

However, provision of a random number generating circuit in the wireless tag hinders a reduction in size and lowering of the costs of the wireless tag.

On the other hand, in a case where the random number generating circuit is not provided in the wireless tag, it is not possible to perform authentication of whether or not the reader/writer is a legitimate device from the wireless tag in the mutual authentication in accordance with a symmetrical cipher algorithm.

Here, in regard to the wireless tag, there are increasing expectations for use in services such as tickets for events such as concerts which are held, for example, on a given day or for a short period such as a few days.

In regard to services where a validity period (period where it is possible to use a ticket or a multi-pass) is limited to a short period (referred to below as short-term service) other than the ticket for events such as multi-passes used at theme parks and the like, even if analysis of legitimate wireless tags is performed since fraudulent wireless tags are used, since the validity period elapses before the analysis is completed, it is not necessary to have security as strong as is demanded for services with no validity period such as with electronic money and the like.

As above, in regard to the wireless tag which is used in the short-term service, it is not necessary to have security as strong as is demanded for services with no validity period, but even then, it is necessary to ensure security to a degree of which analysis of the wireless tag is difficult in the validity period of the short-term service.

It is desirable to be able to achieve a reduction in size and a lowering of the costs of the wireless tag while ensuring security with regard to the wireless tag.

A communication device according to a first embodiment of the invention is provided with a communication means which performs proximity communication with a reader/writer; a storage means which stores data and a sequence number where a value is updated regularly each time data is written into the storage means; and a control means which controls the writing of the data to the storage means in accordance with a command from the reader/writer; where the communication means sends the sequence number stored in the storage means to the reader/writer and receives first encryption data, which is generated by the reader/writer using a value based on the sequence number and writing target data which is target data which is written into the storage means, and the writing target data from the reader/writer; and the control means generates second encryption data using the value based on the sequence number and the writing target data which is received by the communication means, and writes the writing target data which is received by the communication means into the storage means and updates the sequence number stored in the storage means in a case where the first encryption data and the second encryption data match.

A communication method according to the first embodiment of the invention of a communication device, which is provided with a communication means which performs proximity communication with a reader/writer, a storage means which stores data and a sequence number where a value is updated regularly each time data is written into the storage means, and a control means which controls the writing of the data into the storage means in accordance with a command from the reader/writer, including the steps of sending the sequence number stored in the storage means to the reader/writer and receiving first encryption data, which is generated by the reader/writer using a value based on the sequence number and writing target data which is target data which is written into the storage means, and the writing target data from the reader/writer; and generating second encryption data using the value based on the sequence number and the writing target data which is received by the communication means, and writing the writing target data which is received by the communication means into the storage means and updating the sequence number stored in the storage means in a case where the first encryption data and the second encryption data match.

In the first embodiment of the invention, the communication means sends the sequence number stored in the storage means to the reader/writer, and receives first encryption data, which is generated by the reader/writer using a value based on the sequence number and writing target data which is target data which is written into the storage means, and the writing target data from the reader/writer. Then, the control means generates second encryption data using the value based on the sequence number and the writing target data which is received by the communication means, and writes the writing target data which is received by the communication means into the storage means and updates the sequence number stored in the storage means in a case where the first encryption data and the second encryption data match.

A communication device according to a second embodiment of the invention is provided with a communication means which performs proximity communication with a wireless tag which has a storage means which stores data and a sequence number where a value is updated regularly each time data is written into the storage means; and a generating means which generates first encryption data using a value based on the sequence number sent from the wireless tag and writing target data which is target data which is written into the storage means; where the communication means sends the first encryption data and the writing target data to the wireless tag.

A communication method according to the second embodiment of the invention of a communication device which is provided with a communication means which performs proximity communication with a wireless tag which has a storage means which stores data and a sequence number where a value is updated regularly each time data is written into the storage means, and a generating means which generates first encryption data using the value based on the sequence number sent from the wireless tag and writing target data which is target data which is written into the storage means, including the steps of generating the first encryption data; and sending the first encryption data and the writing target data to the wireless tag.

In the second embodiment of the invention, the first encryption data is generated using the value based on the sequence number sent from the wireless tag and writing target data which is target data which is written into the storage means, and the first encryption data and the writing target data are sent to the wireless tag.

A communication system according to a third embodiment of the invention is provided with a reader/writer and a wireless tag which perform proximity communication; where the reader/writer has a first communication means which performs proximity communication with the wireless tag which has a storage means which stores data and a sequence number where a value is updated regularly each time data is written into the storage means, and a generating means which generates first encryption data using a value based on the sequence number sent from the wireless tag and writing target data which is target data which is written into the storage means, where the first communication means sends the first encryption data and the writing target data to the wireless tag; and the wireless tag has a second communication means which performs proximity communication with the reader/writer, the storage means, and a control means which controls the writing of the data to the storage means in accordance with a command from the reader/writer, where the second communication means sends the sequence number stored in the storage means to the reader/writer and receives first encryption data and the writing target data sent from the reader/writer, and the control means generates second encryption data using the value based on the sequence number and the writing target data which is received by the second communication means, and writes the writing target data which is received by the second communication means into the storage means and updates the sequence number stored in the storage means in a case where the first encryption data and the second encryption data match.

A communication method according to the third embodiment of the invention of a communication system, which is provided with a reader/writer and a wireless tag which perform proximity communication, where the reader/writer has a first communication means which performs proximity communication with the wireless tag which has a storage means which stores data and a sequence number where a value is updated regularly each time data is written into the storage means, and a generating means which generates first encryption data using a value based on the sequence number sent from the wireless tag and writing target data which is target data which is written into the storage means, and the wireless tag has a second communication means which performs proximity communication with the reader/writer, the storage means, and a control means which controls the writing of the data to the storage means in accordance with a command from the reader/writer, including the steps of sending the first encryption data and the writing target data to the wireless tag; and sending the sequence number stored in the storage means to the reader/writer and receiving first encryption data and the writing target data sent from the reader/writer, generating second encryption data using the value based on the sequence number and the writing target data which is received by the second communication means, and writing the writing target data which is received by the second communication means into the storage means and updating the sequence number stored in the storage means in a case where the first encryption data and the second encryption data match.

In the third embodiment of the invention, the wireless tag sends the sequence number stored in the storage means to the reader/writer and receives first encryption data, which is generated by the reader/writer using the value based on the sequence number and the writing target data, and the writing target data. Furthermore, the wireless tag generates second encryption data using the value based on the sequence number and the received writing target data, and writes the received writing target data into the storage means and updates the sequence number stored in the storage means in a case where the first encryption data and the second encryption data match.

Here, the communication device may be an independent device or may be an internal block which configures one device.

According to the first to the third embodiments of the invention, with regard to a wireless tag which is a communication device which performs proximity communication with a reader/writer, it is possible to achieve a reduction in size and the lowering of the costs of the wireless tag while ensuring security.

BRIEF DESCRIPTION OF THE DRAWINGS

FIG. 9 is a diagram illustrating another example of a logic format of the memory section.

DESCRIPTION OF THE PREFERRED EMBODIMENTS

Communication System According to Embodiment of Invention

Figure 1:
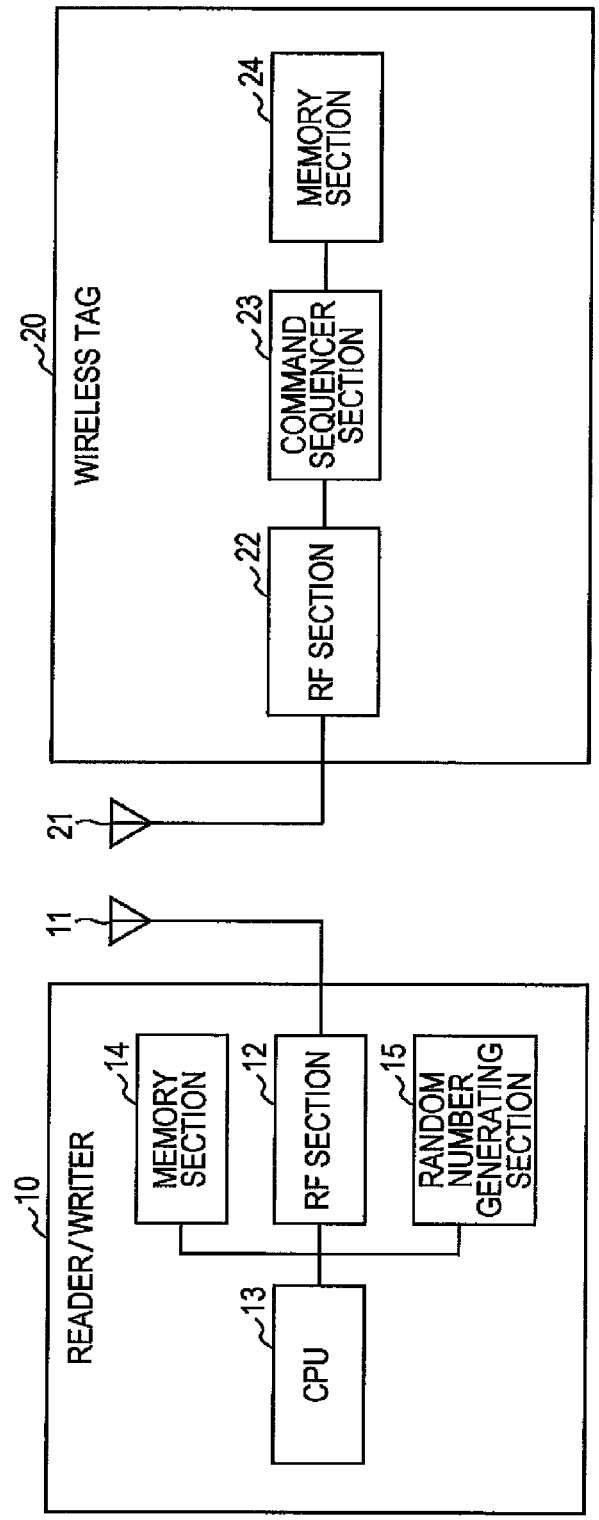
FIG. 1 is a block diagram illustrating a configuration example of a communication system according to an embodiment of the present invention.

FIG. 1 is a block diagram illustrating a configuration example of a communication system (a system refers to a logical collection of a plurality of devices irrespective of whether each of the configuring devices is in the same housing) according to an embodiment of the invention.

In FIG. 1, the communication system is configured from a reader/writer 10 and a wireless tag 20.

The reader/writer 10 performs proximity communication with the wireless tag 20 without contact by outputting an RF signal from an antenna 11, and data is stored (written) in (a memory section 24 built into) the wireless tag 20 or data is read out from the wireless tag 20.

That is, the reader/writer 10 has the antenna 11, an RF section 12, a CPU (Central Processing Unit) 13, a memory section 14 and a random number generating section 15.

The antenna 11 is configured by, for example, a resonance circuit formed from a coil and a condenser, and sends an RF signal from the RF section 12.

The RF section 12 performs proximity communication with the wireless tag 20.

That is, by outputting a modulation signal, which is obtained by modulation of a carrier as an RF signal in accordance with commands and data from the CPU 13, from the antenna 11, the RF section 12 sends the commands and data to the wireless tag 20.

In addition, the RF section 12 outputs the carrier as the RF signal from the antenna 11 and the wireless tag receives the data and the like which is sent by load modulating of the carrier as the RF signal.

The CPU 13 performs control of each block which configures the reader/writer 10 and other processing by executing a program stored in the memory section 14.

The memory section 14 stores the program executed by the CPU 13. In addition, the memory section 14 stores data which is read out from the wireless tag 20, data which is written into the wireless tag 20, and the like.

The random number generating section 15 generates random numbers used in one-side authentication where there is authentication (by the reader/writer 10) of whether or not the wireless tag 20 is a legitimate device.

When brought close to the reader/writer 10, the wireless tag 20 starts operating with the RF signal which the reader/writer 10 outputs from the antenna 11 as a power source, and performs proximity communication with the reader/writer 10.

In the proximity communication, the reader/writer 10 sends data by modulation of the RF signal in accordance with the data, and the wireless tag 20 receives the data which the reader/writer 10 sends using the RF signal and writes the data into the built-in memory section 24.

In addition, the wireless tag 20 reads out the data stored in the memory section 24 and sends the data to the reader/writer 10 by load modulating of the RF signal sent from the reader/writer 10.

That is, the wireless tag 20 has an antenna 21, an RF section 22, a command sequencer section 23, and the memory section 24.

The antenna 21 is configured by, for example, a resonance circuit formed from a coil and a condenser, receives the RF signal from the reader/writer 10, and supplies the RF signal to the RF section 22.

The RF section 22 performs proximity communication with the reader/writer 10.

That is, when receiving the RF signal from the reader/writer 10 using the antenna 21 due to the reader/writer 10 and the wireless tag 20 being brought close, the RF section 22 obtains electric power which is a power source from the RF signal and supplies the electric power to the necessary blocks.

In addition, the RF section 22 demodulates the RF signal from the reader/writer 10 to the commands and data and supplies the commands and data to the command sequencer section 23.

Furthermore, the RF section 22 sends the data to the reader/writer 10 by load modulating of the RF signal from the reader/writer 10 in accordance with the data supplied from the command sequencer section 23.

The command sequencer section 23 performs control such as the reading and writing of the data to the memory section 24 and the like by performing sequence control in accordance with the commands from the reader/writer 10 which are supplied from the RF section 22.

That is, in a case where the command from the reader/writer 10 is a write command which requests the writing of the data, the command sequencer section 23 writes the data, which is sent from the reader/writer 10 with the write command and supplied from the RF section 22, into the memory section 24.

In addition, in a case where the command from the reader/writer 10 is a read command which requests the reading out of the data, the command sequencer section 23 reads out the data from the memory section 24 and supplies the data to the RF section 22.

The memory section 24 is, for example, a non-volatile memory such as an EEPROM or the like and stores data under the control (management) of the command sequencer section 23.

Here, as above, the reader/writer 10 has the random number generating section 15 which generates random numbers used in the authenticating of the wireless tag 20, but the wireless tag 20 does not have a circuit which generates random numbers used in the authenticating of the reader/writer 10.

Accordingly, it is possible to reduce the size and lower the cost of the wireless tag 20 to the extent that the wireless tag 20 does not have a circuit which generates random numbers.

Here, it is not possible for the wireless tag 20 to authenticate the reader/writer 10 using random numbers since the wireless tag 20 does not have a circuit which generates random numbers.

However, in the wireless tag 20, it is not preferable in terms of security that authentication of the reader/writer 10 is not performed at all.

Therefore, the wireless tag 20 limits access from fraudulent reader/writers by performing authentication of the reader/writer 10 using an authentication method which may be referred to as simplified as will be described later, and according to this, security which is greater than the minimum necessary is ensured.

Logic Format of Memory Section 24

Figure 2:
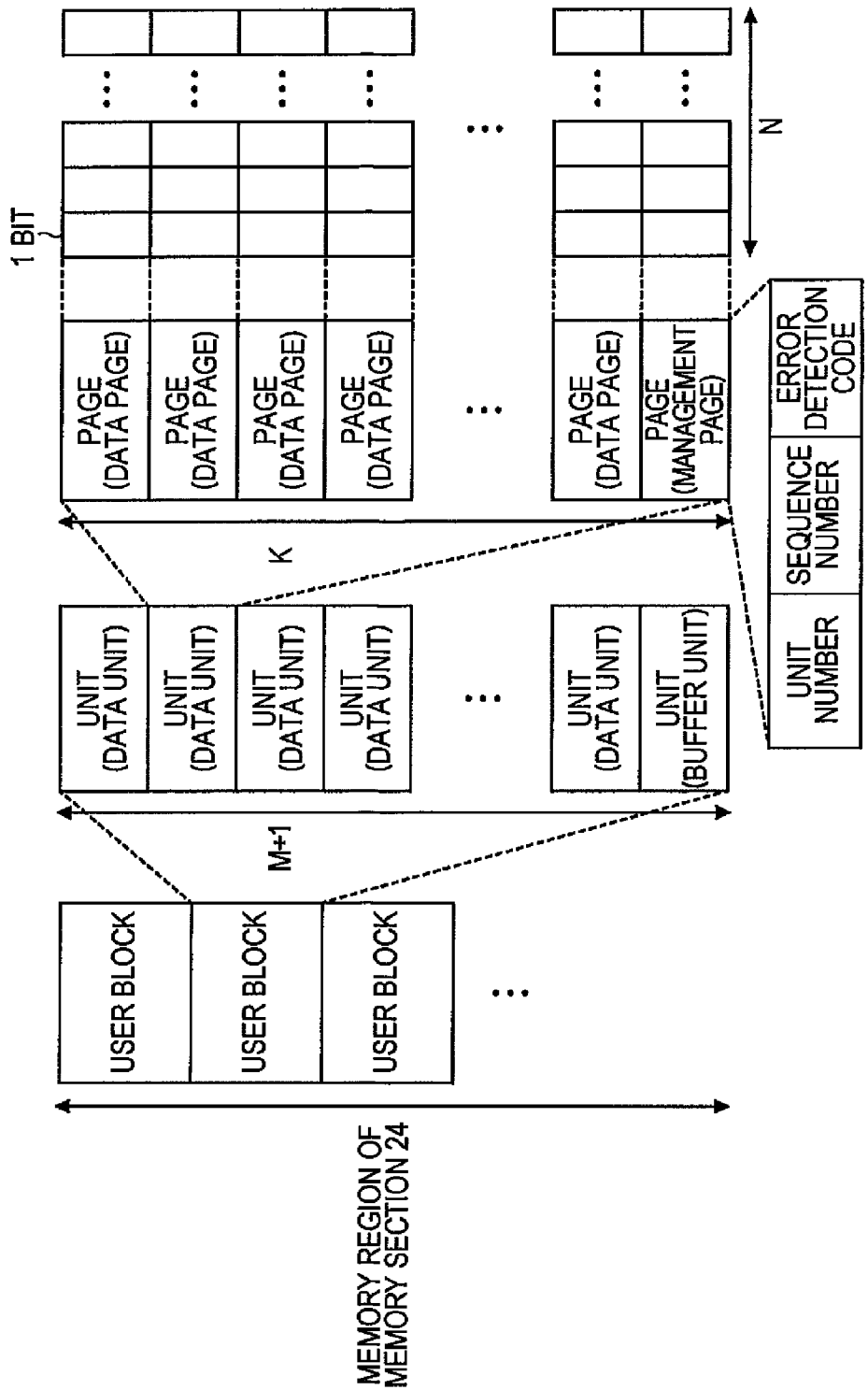
FIG. 2 is a diagram illustrating an example of a logic format of a memory section.

FIG. 2 is a diagram describing a logic format of the memory section 24 of the wireless tag 20 of FIG. 1.

A portion of a memory region of the memory section is a user block which is a memory region of the smallest unit which is possible to be allocated to, for example, a commuter ticket, electronic money which is managed by a certain service provider or a service such as ticketing to an event or the like.

In the memory section 24, one or more user blocks are provided.

Here, one or more user blocks are allocated to the service, and data for providing the service is stored in the one or more user blocks.

The user block has units which number M+1 which is a plurality (M is an integer of one or more).

The data for providing the service is written into the units. However, one unit out of the M+1 units which configure the user block functions as a buffer which buffers the data written into the user block.

As above, since the one unit which configures the user block functions as the buffer, the user block has units which number M+1 which is a plurality which is a total of the one unit which functions as the buffer and the one or more M units which store the data for providing the service.

Here, the unit which functions as the buffer out of the M+1 units which configure the user block below is referred to as a buffer unit, and the units which are not the buffer unit are data units.

In FIG. 2, the M+1th unit out of the M+1 units which configure the user block is the buffer unit and the 1st to the Mth units are data units.

Here, the unit which is the buffer unit changes when the writing of the data in the user block is performed, but the description of this will be described later.

The unit has pages which number K which is one or more.

The page is a memory region of the smallest unit where it is possible to perform writing to the memory section 24, and in FIG. 2, one page is a memory region with N bits.

Here, in FIG. 2, one page out of the pages of the unit is used as a page which stores management information for managing the memory region of the memory section 24 (management page).

That is, in FIG. 2, one predetermined page out of the K pages which configure the unit is a management page where management information for managing the unit is stored.

Accordingly, in FIG. 2, since one or more pages which store data (data page) and one management page are necessary in the unit, the number K of pages which configure the unit is a plurality.

Here, in FIG. 2, the Kth page out of the K pages which configure the unit is the management page. The page which is the management page does not change (similar to the buffer unit) and is a fixed page.

A unit number, (one) sequence number, and error detection code is written into the management page as the unit management information.

The unit number is information which specifies the unit which has the management page where the unit number is written.

The sequence number is a value which is updated regularly each time data is written into the memory section 24, and for example, it is possible to adopt an output value and the like which is determined with the previous value as an input value using a table where there is a link between a value which is incremented or decremented by a predetermined value such as one with regard to the previous value, a value which is determined by calculating a predetermined function with the previous value as a parameter, the input value, and the output value.

In addition, here, for example, a value which is incremented by one each time data is written into the memory section 24 is set to be used as the sequence number.

The error detection code is a code for error detection which detects errors in the data which is written into the unit, and for example, is CRC (Cyclic Redundancy Checking) or the like.

Control of Data Writing to Memory Section 24

Figure 3:
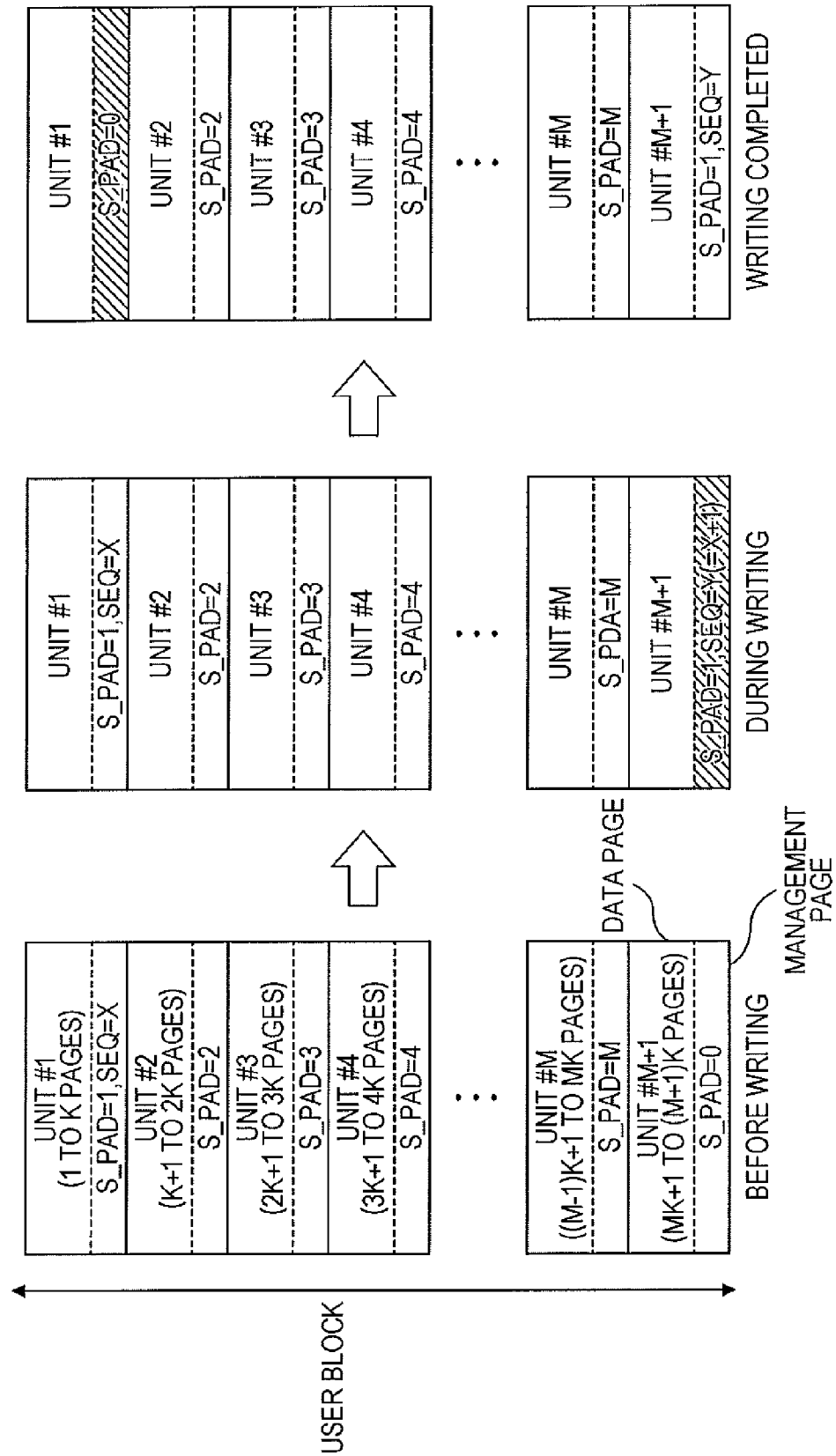
FIG. 3 is a diagram describing data writing to the memory section.

FIG. 3 is a diagram describing control of data writing to the memory section 24 using the command sequencer section 23.

In FIG. 3, the user block which has the unit where the data is written has M+1 units #1, #2, ..., #M+1.

Then, in FIG. 3, before the writing of the data is performed (before writing), out of the units #1 to #M+1, for example, the M+1th unit #M+1 is the buffer unit and the other 1st to the Mth units #1 to #M are the data units.

In addition, in FIG. 3, a unit number S_PAD of the data unit #m before writing is a value m.

Here, the unit number S_PAD is not given to the buffer unit, but in FIG. 3 (and in the same manner in FIG. 5 described later), for convenience, the unit number S_PAD of the unit #M+1 which is the buffer unit is set to zero as a value which indicates the buffer unit.

In addition, in FIG. 3, the sequence number SEQ of the data unit #1 before writing is a value X. The diagrammatical representation of the sequence numbers SEQ of the other data units #2 to #M is omitted.

Here, the one unit #m is configured from K pages. Here, the first page of the unit #1 of the first unit block is set as the first page, and the unit #m is configured from the (m−1)K+1th page to the mKth page of the K pages. Then, the mKth page which is the last page of each of the units #m is the management page.

Here, for example, with regard to the reader/writer 10 and the wireless tag 20, the write command, which requests the writing of data to the unit where the unit number S-PAD has a value 1, is set to be sent with the data.

In this case, the command sequencer section 23 writes the data which is sent with the write command to the unit #M+1 which is the buffer unit and not to a target unit which is a unit which is a target where writing is to be performed, that is, not the unit #1 where the unit number S_PAD has a value 1 (the unit with the unit number S_PAD where writing is requested by the write command) in accordance with the write command from the reader/writer 10.

Furthermore, the command sequencer section 23 writes the unit number S_PAD=1 which is the same as the unit number S_PAD=1 of the unit #1 which is the target unit, the sequence number SEQ updated to the predetermined value Y, and the error detection code to the management page of the unit #M+1 which is the buffer unit.

Here, in FIG. 3 (and in the same manner in FIG. 4 described later), the diagrammatical representation of the error detection code is omitted.

In addition, in FIG. 3, the sequence number SEQ with the value Y, which is written into the management page of the #M+1 unit which is the buffer unit, is a value X+1 which is updated by incrementing the sequence number SEQ=X which is written into the management page of the unit #1 which is the target unit by just one.

As above, by writing the unit number S_PAD where the value is 1, the sequence number SEQ updated to the predetermined value Y, and the error detection code into the management page of the unit #M+1 which is the buffer unit, the unit #M+1 become the data unit where the unit number S_PAD has the value 1 and not the buffer unit.

As a result, at this point in time, the unit with the unit number S_PAD with the value 1 becomes the two of the unit #1 and the unit #M+1.

Here, the sequence number SEQ=Y of the unit #M+1 becomes the value which is newer than the sequence number SEQ=X of the unit #1, that is, the value X+1 where the sequence number SEQ=X has been updated.

Accordingly, in regard to the two units, the unit #1 and the unit #M+1 where the unit number S_PAD has the value 1, it is possible to distinguish between the unit #M+1 where the latest data has been written and the unit #1 where data was previously written (the unit which stores the data which was written immediately before the latest data, out of the data which is written into the units where the unit number S_PAD has the value 1) by referring to the sequence SEQ.

Here, in the case where there are two units with the same unit number S_PAD, out of the two units, the unit where the latest data is written (the unit with the larger sequence number in the embodiment) is referred to as a new unit, and the unit where the data is written in the past (the unit with the smaller sequence number in the embodiment) is referred to as an old unit.

After that, the command sequencer section 23 erases the management page of the older unit out of the two of the unit #1 and the unit #M+1 where the unit number S_PAD has the value 1, that is, the unit #1 which is the target unit, and by being in an erased state, writing processing, where data is written into the memory section 24 with the unit #1 as the new buffer unit, is completed.

Here, as described above, the unit number S_PAD is not given to the buffer unit, but in FIG. 3, the unit number S_PAD of the unit #1 which is the new buffer unit is set to the value 0 which indicates the buffer unit.

As above, the command sequencer section 23 writes the data into the unit #M+1 which is the buffer unit in accordance with the write command from the reader/writer 10, the unit number S_PAD=1 of the unit #1 which is the target unit is written as the unit number of the buffer unit, and the writing of data to the unit #M+1 where the unit number S_PAD is the value 1, which is the target unit as a result of the unit #1 being set as the new buffer unit, is performed.

As a result, in the memory section 24, in relation to the data which is stored in the unit where the unit number S_PAD is the value 1, since the latest data (the data which is written into the unit #M+1 in FIG. 3) is written in with the (previous) data immediately before (the data which was written into the unit #1 in FIG. 3) being left as it is, it is possible to deal with cases where there are inconsistencies in the data stored in the memory section 24 which are due to memory corruption, that is, for example, the separating of the wireless tag 20 from the reader/writer 10 during when access to the memory section 24 is being performed and the like.

Figure 4:
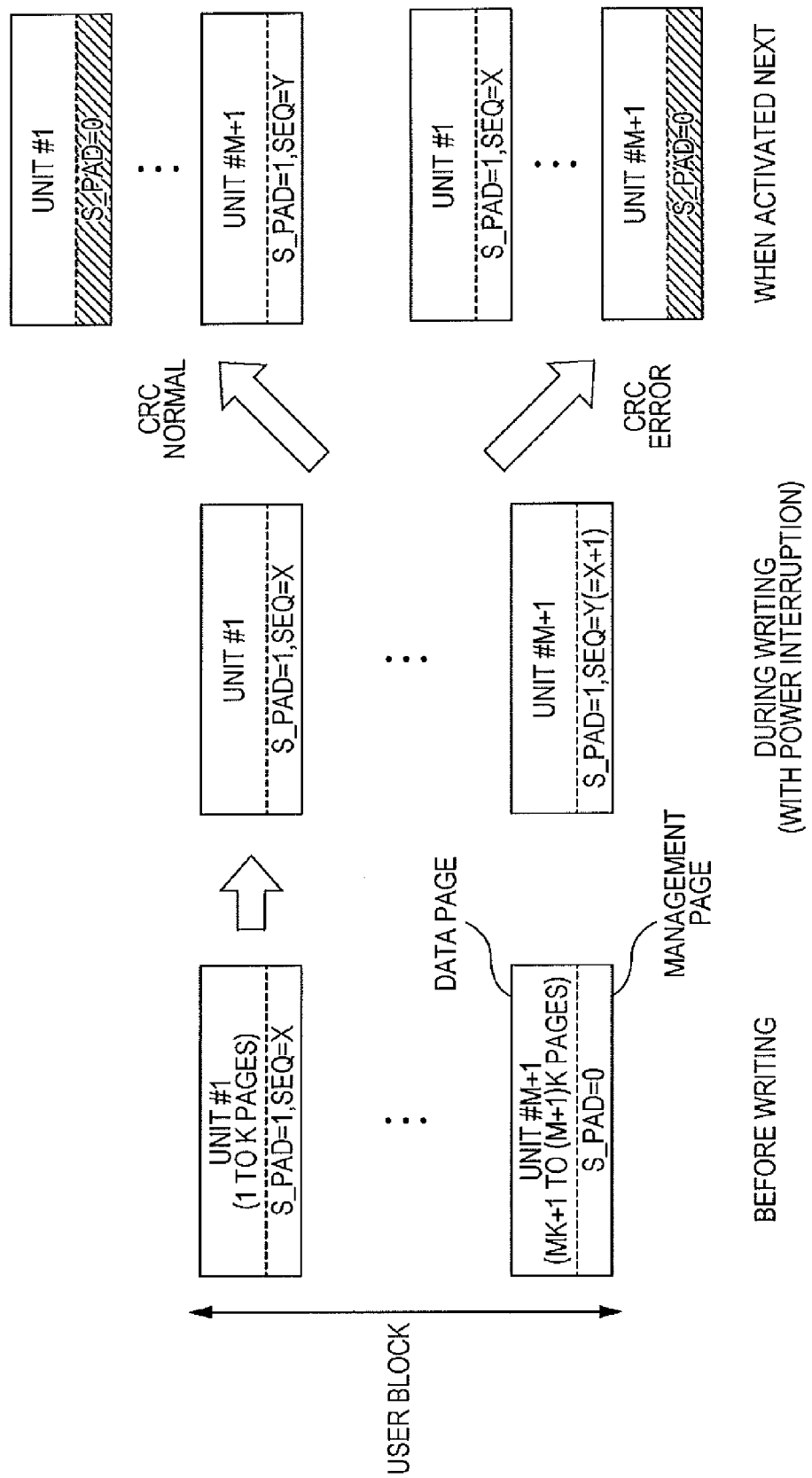
FIG. 4 is a diagram describing a measure against memory corruption.

FIG. 4 is a diagram describing a measure against memory corruption.

In FIG. 4, before writing, in the same manner as the case of FIG. 3, the M+1th unit #M+1 is the buffer unit and the other 1st to the Mth units #1 to #M are the data units.

In addition, before writing, the unit number S_PAD of the data unit #m is the value m, and the unit number S_PAD of the unit #M+1 which is the buffer unit is the value 0 which indicates the buffer unit.

Here, for example, in the same manner in FIG. 3, with regard to from the reader/writer 10 to the wireless tag 20, the write command, which requests the writing of data to the target unit which is the unit where the unit number S_PAD has a value 1, is set to be sent with the data.

In this case, as described in FIG. 3, the command sequencer section 23 writes the data which is sent with the write command into the unit #M+1 which is the buffer unit (the unit where the unit number S_PAD is the value 0) in accordance with the write command from the reader/writer 10.

Furthermore, as described in FIG. 3, the command sequencer section 23 writes the unit number S_PAD=1 which is the same as the unit number S_PAD=1 of the unit #1 which is the target unit, the sequence number SEQ with the value Y=X+1 where the sequence number SEQ=X of the unit #1 which is the target unit has been updated, and the error detection code to the management page of the unit #M+1 which is the buffer unit, and after that, the management page of the unit #1 which is the target unit is erased, and by being in an erased state, writing processing, where data is written into the memory section 24 with the unit #1 as the new buffer unit, is completed.

Here, during the writing processing, that is, for example, during when the unit number S_PAD=1, the sequence number SEQ where the predetermined value Y has been updated, and the error detection code are being written into the management page of the unit #M+1 which is the buffer unit, the wireless tag 20 is separated from the reader/writer 10 and the necessary electric power is not supplied to the wireless tag (the power source is cut off).

In this case, next, when the power source is supplied and there is activation (next time of activation) due to the reader/writer 10 and the wireless tag 20 being brought close, the command sequencer section 23 recovers the storage content of the memory section 24.

That is, for example, when the power source is cut off after at least the unit number S_PAD=1 and the sequence number SEQ where the predetermined value Y has been updated out of the unit number S_PAD=1, the sequence number SEQ with the predetermined value Y, and the error detection code, are written into the management page of the unit #M+1 which is the buffer unit, there are the two of the unit #1 and the unit #M+1 where the unit number S_PAD is the same, the value 1.

As described in FIG. 3, in regard to the two of the unit #1 and the unit #M+1 where the unit number S_PAD has the value 1, it is possible to distinguish between the unit (the new unit) #M+1 where the latest data has been written and the unit (the old unit) #1 where data was written in the past by referring to the sequence number SEQ.

At the next time of activation, the command sequencer section 23 performs error detection using a CRC as the error detection code of the management page of the unit #M+1 which is the new unit, and in a case where an error is not detected (in a case where the error detection code is normal), with the writing of the data to the unit #M+1 which is the new unit having been normally completed, the management page of the unit #1 which is the old unit is erased, and by being in an erased state (the unit number S_PAD is set to the value 0 which indicates the buffer unit in FIG. 4), the unit #1 is set as the buffer unit.

Then, after that, as described in FIG. 3, the writing of new data into the buffer unit is performed.

On the other hand, in a case where an error is detected (in a case where there is an error in the error detection code) as a result of the error detection using the CRC as the error detection code of the management page of the unit #M+1 which is the new unit, with the writing of the data to the unit #M+1 which is the new unit having not been normally completed, the command sequencer section 23 returns the state of the memory section 24 to, for example, a previous state where the writing of data into the unit #M+1 which is the new unit is performed.

That is, the command sequencer section 23 erases the management page of the unit #M+1 which is the new unit, and by being in an erased state (the unit number S_PAD is set to the value 0 which indicates the buffer unit in FIG. 4), the unit #M+1 is set as the buffer unit.

Then, after that, as described in FIG. 3, the writing of new data into the buffer unit is performed.

One-Side Authentication

Figure 5:
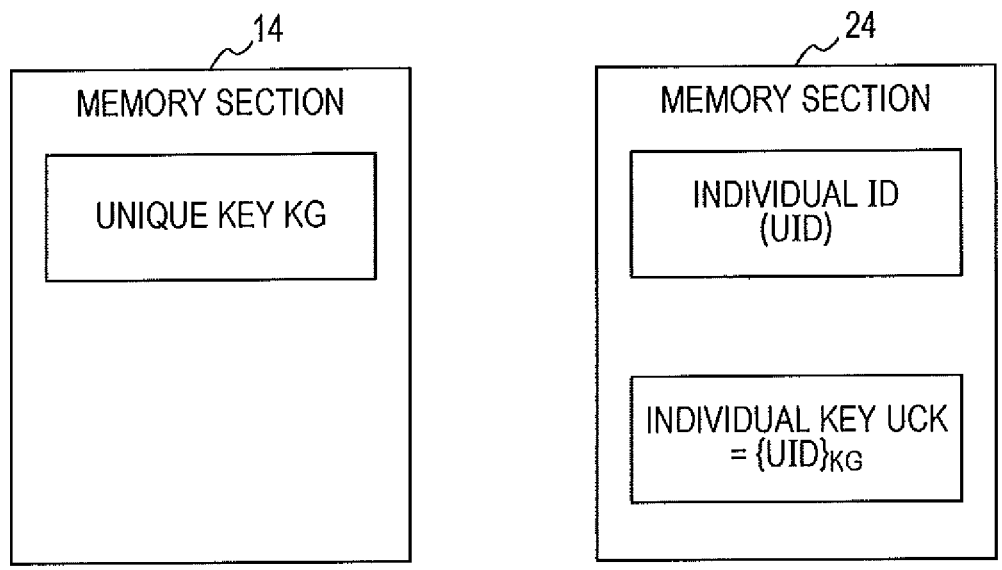
FIG. 5 is a diagram illustrating information necessary for one-side authentication which is stored in a memory section of a reader/writer and a memory section of a wireless tag.

FIG. 5 is a diagram for describing one-side authentication.

Here, as described in FIG. 1, the reader/writer 10 has the random number generating section 15 which generates random numbers used in the authenticating of the wireless tag 20, but the wireless tag 20 does not have a circuit which generates random numbers used in the authenticating of the reader/writer 10.

Therefore, the reader/writer 10 which has the random number generating section 15 performs one-side authentication where the wireless tag 20 is authenticated by a so-called challenge and response method using the random numbers generated by the random number generating section 15.

As a result, the memory section 14 of the reader/writer 10 and the memory section 24 of the wireless tag 20 store information necessary for one-side authentication.

FIG. 5 is a diagram illustrating information necessary for one-side authentication which is stored in the memory section 14 of the reader/writer 10 and the memory section 24 of the wireless tag 20.

A unique key KG, which is a key unique to the service which is provided by the reader/writer 10, is stored in the memory section 14 of the reader/writer 10.

On the other hand, an individual ID (=UID) which is an ID which is unique ID is stored as distinguishing information which distinguishes the wireless tag 20 in the memory section 24 of the wireless tag 20.

Furthermore, an individual key UCK, which is a key unique to the wireless tag 20, is stored in the memory section 24 of the wireless tag 20.

The individual key UCK is generated using the individual ID and the unique key KG. That is, the individual key UCK is generated by performing processing which corresponds to the unique key KG on the individual ID (for example, encryption of the individual ID using the unique key KG).

Accordingly, when the processing which corresponds to the unique key KG is indicated by { }KG, the individual key UCK is indicated by the equation UCK={UID}KG.

Here, in a case where the wireless tag 20 is used in a plurality of services, only the number of individual keys UCK of the plurality of services is stored in the memory section 24 of the wireless tag 20.

Below, to simplify the description, there is only one user block in the memory section 24 of the wireless tag 20, and accordingly, there is also only one service where the wireless tag 20 is able to be used.

Figure 6:
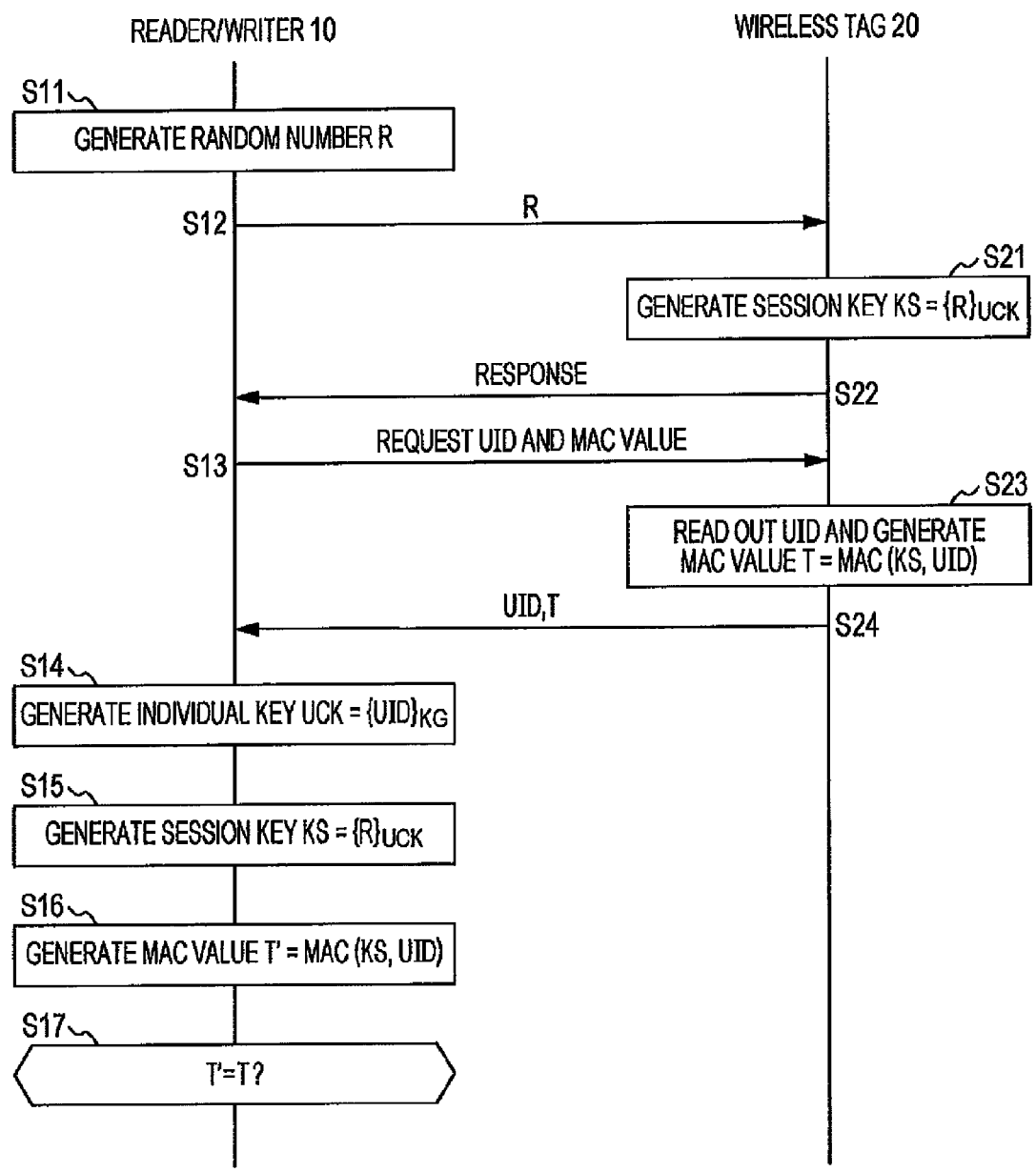
FIG. 6 is a diagram describing processing of the reader/writer and the wireless tag in a case where the reader/writer performs one-side authentication.

FIG. 6 is a diagram describing processing of the reader/writer 10 and the wireless tag 20 in a case where the reader/writer 10 performs one-side authentication where the reader/writer 10 authenticates the wireless tag 20 and the wireless tag 20 does not perform authentication of the reader/writer 10.

For example, when in a state where the reader/writer 10 and the wireless tag 20 are brought close by the wireless tag 20 being held over the reader/writer 10, proximity communication between the reader/writer 10 and the wireless tag 20 starts.

Then, in step S11, the random number generating section 15 of the reader/writer 10 generates the random number R and supplies the random number R to the RF section 12.

In step S12, the RF section 12 sends the random number R from the random number generating section 15 to the wireless tag 20 via the antenna 11, and the RF section 22 of the wireless tag 20 receives the random number R from the RF section 12 of the reader/writer 10 via the antenna 21 and supplies the random number R to the command sequencer section 23.

In step S21, the command sequencer section 23 generates a session key KS used in the session between the reader/writer 10 and the wireless tag 20 using the random number R from the RF section 22 and the individual key UCK stored in the memory section 24.

That is, the command sequencer section 23 generates the session key KS={R}UCK by performing the processing which corresponds to the individual key UCK on the random number R.

After that, in step S22, the command sequencer section 23 sends a response, which notifies that the random number R has been received, to the reader/writer 10 from the RF section 22 by controlling the RF section 22.

The RF section 12 of the reader/writer 10 receives the response from (the RF section 22 of) the wireless tag 20. Then, in step S13, the CPU 13 of the reader/writer 10 sends a read command, which requests the individual ID=UID of the wireless tag 20 and, for example, a MAC (Message Authentication Code) value as encryption data of the individual ID for verifying the legitimacy of the individual ID, to the wireless tag 20 by controlling the RF section 12.

In the wireless tag 20, the RF section 22 receives the read command from (the RF section 12 of) the reader/writer and supplies the read command to the command sequencer section 23.

In step S23, the command sequencer section 23 reads out the individual ID=UID from the memory section 24 in accordance with the read command from the RF section 22, and generates an MAC value T=MAC (KS, UID) as encryption data of the individual ID=UID (third encryption data) using the individual ID and the session key KS generated immediately beforehand.

Then, the command sequencer section 23 supplies the individual ID=UID and the MAC value T generated using the individual ID to the RF section 22.

In step S24, the RF section 22 sends the individual ID=UID from the command sequencer section 23 and the MAC value T to the reader/writer 10.

Here, as a method of generating the MAC value T=MAC (KS, UID) using the individual ID=UID and the session key KS, it is possible to adopt a method where the individual ID=UID is encrypted with a predetermined encryption format, such as DES (Data Encryption Standard) or the like, using the session key KS, a method where a predetermined hash function is calculated using the individual ID=UID and the session key KS, or the like.

Here, since it is sufficient if the MAC value T is able to verify that the message (the individual ID=UID in this case) has not been tampered with, it is not necessary that the original information (the individual ID=UID and the session key KS) is able to be decrypted.

Accordingly, it is possible to use, for example, a one-way function in the generating of the MAC value T.

The RF section 12 of the reader/writer 10 receives the individual ID=UID and the MAC value T from (the RF section 22 of) the wireless tag 20 and supplies the individual ID=UID and the MAC value T to the CPU 13.

In step S14, the CPU 13 reads out the unique key KG from the memory section 14 and generates the individual key UCK={UID}KG of the wireless tag 20 using the unique key KG and the individual ID=UID from the RF section 12.

Then, in step S15, the CPU 13 generates the session key KS={R}UCK in the same manner as the wireless tag 20 using the individual key UCK and the random number R generated immediately before by the random number generating section 15.

After that, in step S16, the CPU 13 generates the MAC value T'=MAC (KS, UID) as encryption data of the individual ID=UID (fourth encryption data) in the same manner as the wireless tag 20 using the session key KS and the individual ID=UID from the RF section 12.

Then, in step S17, the CPU 13 compares the MAC value T' generated as above and the MAC value T from the RF section 12.

As a result of the comparison of the MAC values T' and T, in a case where the MAC values T' and T are not equal, the CPU 13 performs predetermined error processing (for example, processing where that the authentication has failed is displayed on a display (not shown) or the like) on the basis that the authentication of the wireless tag 20 has failed and the processing ends.

Accordingly, the reader/writer 10 does not perform access to the wireless tag 20 where the authentication has failed.

On the other hand, in a case where the MAC values T' and T are equal, the CPU 13 performs the writing of the data to the wireless tag 20 below as necessary on the basis that the authentication of the wireless tag 20 was successful.

As above, the reader/writer 10 uses random numbers, and in a case of performing one-side authentication, it is possible to prevent the legitimate reader/writer 10 from accessing the fraudulent wireless tag.

However, by only the reader/writer 10 performing one-side authentication, it is not possible to prevent the fraudulent reader/writer from accessing the legitimate wireless tag 20.

Therefore, the wireless tag 20 performs authentication of the reader/writer 10 by a simplified authentication method using the one-side authentication performed by the reader/writer 10.

Authentication of Reader/Writer 10 by Wireless Tag 20

Figure 7:
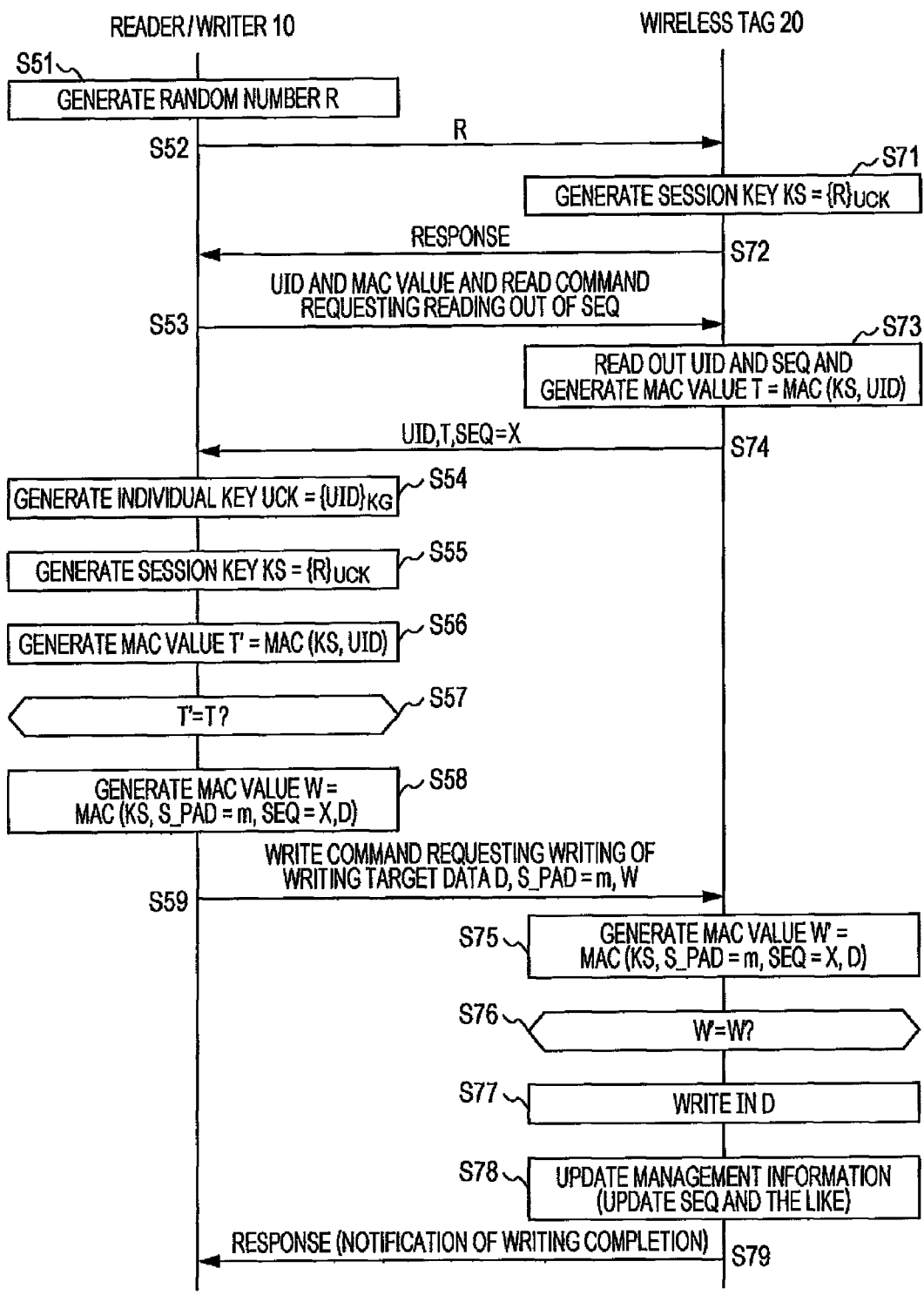
FIG. 7 is a diagram describing processing of the reader/writer and the wireless tag in a case where the reader/writer performs one-side authentication and the wireless tag performs authentication of the reader/writer using the one-side authentication.

FIG. 7 is a diagram describing processing of the reader/writer 10 and the wireless tag 20 in a case where the reader/writer 10 performs one-side authentication for the wireless tag 20 and the wireless tag 20 performs authentication of the reader/writer 10 using the one-side authentication.

For example, when in a state where the reader/writer 10 and the wireless tag 20 are brought close by the wireless tag 20 being held over the reader/writer 10, proximity communication between the reader/writer 10 and the wireless tag 20 starts.

Then, in step S51, the random number generating section 15 of the reader/writer 10 generates the random number R and supplies the random number R to the RF section 12.

In step S52, the RF section 12 sends the random number R from the random number generating section 15 to the wireless tag 20, and the RF section 22 of the wireless tag 20 receives the random number R from the RF section 12 of the reader/writer 10 and supplies the random number R to the command sequencer section 23.

In step S71, the command sequencer section 23 generates the session key KS using the random number R from the RF section 22 and the individual key UCK stored in the memory section 24.

After that, in step S72, the command sequencer section 23 sends a response, which notifies that the random number R has been received, to the reader/writer 10 from the RF section 22 by controlling the RF section 22.

The RF section 12 of the reader/writer 10 receives the response from (the RF section 22 of) the wireless tag 20. Then, in step S53, the CPU 13 of the reader/writer 10 sends a read command, which requests the individual ID=UID of the wireless tag 20, the MAC value for verifying the legitimacy of the individual ID, and (reading out of) a sequence number SEQ, to the wireless tag 20 by controlling the RF section 12.

Here, logic format of the memory section 24 is as shown in FIG. 2 and there is the management page which stores management information for each unit, and accordingly, in a case where there is the sequence number SEQ which is included in the management information for each unit, in step S53, the sequence number SEQ which the CPU 13 requests using the read command is the sequence number SEQ of the target unit which performs the writing of data.

In the wireless tag 20, the RF section 22 receives the read command from (the RF section 12 of) the reader/writer and supplies the read command to the command sequencer section 23.

In step S73, the command sequencer section 23 reads out the individual ID=UID and the sequence number SEQ=X of the target unit from the memory section 24 in accordance with the read command from the RF section 22.

Furthermore, in step S73, the command sequencer section 23 generates the MAC value T=MAC (KS, UID) as encryption data of the individual ID=UID (third encryption data) using the individual ID which is read out from the memory section 24 and the session key KS generated immediately beforehand.

Then, the command sequencer section 23 supplies the individual ID=UID, the sequence number SEQ=X, and the MAC value T to the RF section 22.

In step S74, the RF section 22 sends the individual ID=UID and the sequence number SEQ=X from the command sequencer section 23 and the MAC value T to the reader/writer 10.

The RF section 12 of the reader/writer 10 receives the individual ID=UID, the sequence number SEQ=X, and the MAC value T from (the RF section 22 of) the wireless tag 20 and supplies the individual ID=UID, the sequence number SEQ=X, and the MAC value T to the CPU 13.

In step S54, the CPU 13 reads out the unique key KG from the memory section 14 and generates the individual key UCK={UID}KG of the wireless tag 20 using the unique key KG and the individual ID=UID from the RF section 12.

Then, in step S55, the CPU 13 generates the session key KS={R}UCK in the same manner as the wireless tag 20 using the individual key UCK and the random number R generated immediately before by the random number generating section 15.

After that, in step S56, the CPU 13 generates the MAC value T'=MAC (KS, UID) as encryption data of the individual ID=UID (fourth encryption data) using the session key KS and the individual ID=UID from the RF section 12.

Then, in step S57, the CPU 13 compares the MAC value T' generated as above and the MAC value T from the RF section 12.

As a result of the comparison of the MAC values T' and T, in a case where the MAC values T' and T are not equal, the CPU 13 performs predetermined error processing on the basis that the authentication of the wireless tag 20 has failed and the processing ends.

Accordingly, the reader/writer 10 does not perform access to the wireless tag 20 where the authentication has failed.

On the other hand, in a case where the MAC values T' and T are equal, the CPU 13 generates, for example, a MAC value W as encryption data which is used in the wireless tag authenticating of the reader/writer 10 on the basis that the authentication of the wireless tag 20 was successful.

That is, the CPU 13 generates, for example, the MAC value W as encryption data of a value based on the sequence number SEQ=X and the writing target data D (first encryption data) using the value based on the sequence number SEQ=X from the wireless tag 20 and the writing target data D which is target data which is written into the target unit.

Specifically, the CPU 13 generates, for example, the MAC value W=MAC (KS, S_PAD=m, SEQ=X, D) of the session key KS, the unit number S_PAD=m of the target unit, the sequence number SEQ=X from the wireless tag 20, and the writing target data D as the encryption data of the value based on the sequence number SEQ=X and the writing target data D.

Then, the CPU 13 supplies the write command which requests the writing of the writing target data D, the writing target data D, the unit number S_PAD=m of the target unit, and the MAC value W=MAC (KS, S_PAD=m, SEQ=X, D) to the RF section 12.

In step S59, the RF section 12 of the reader/writer sends the write command, the writing target data D, the unit number S_PAD=m of the target unit, and the MAC value W from the CPU 13 to the wireless tag 20.

In the wireless tag 20, the write command, the writing target data D, the unit number S_PAD=m of the target unit, and the MAC value W from (the RF section 12 of) the reader/writer 10 is received by the RF section 22 and supplied to the command sequencer section 23.

In step S75, the command sequencer section 23 generates the MAC value W' as encryption data of the value based on the sequence number SEQ=X and the writing target data D received by the RF section 22 (second encryption data) using the value based on the sequence number SEQ=X sent immediately before to the reader/writer 10 and the writing target data D received by the RF section 22.

That is, the command sequencer section 23 generates the MAC value W'=MAC (KS, S_PAD=m, SEQ=X, D) of the session key KS generated immediately beforehand, the unit number S_PAD=m of the target unit, the sequence number SEQ=X sent to the reader/writer 10 immediately beforehand, and the writing target data D received by the RF section 22 as the encryption data of the value based on the sequence number SEQ=X and the writing target data D.

Then, in step S76, the command sequencer section 23 compares the MAC value W' generated as above and the MAC value W from the RF section 22.

As a result of the comparison of the MAC values W' and W, in a case where the MAC values W' and W are not equal, the command sequencer section 23 ends the processing on the basis that the authentication of the reader/writer 10 has failed.

Accordingly, in this case, the wireless tag 20 does not perform the writing in of the writing target data D from the reader/writer 10 and does not respond to the access from the reader/writer 10 after that.

On the other hand, in a case where the MAC values W' and W are equal, the command sequencer section 23 of the wireless tag 20 writes the writing target data D received by the RF section 22, that is, the writing target data D sent from the reader/writer 10 into (the buffer unit which is) the target unit in step S77 on the basis that the authentication of the reader/writer 10 was successful.

After that, in step S78, the command sequencer section 23 performs the processing of updating the management information of the management page of (the buffer unit which is) the target unit, that is, the updating of the unit number S_PAD which is the management information of the target unit and the sequence number SEQ=X and the calculating of the error detection code.

Then, in step S79, the command sequencer section 23 sends a response, which notifies that the writing has been completed, to the reader/writer 10 from the RF section 22 by controlling the RF section 22.

The RF section 12 of the reader/writer 10 receives the response from (the RF section 22 of) the wireless tag 20.

As above, the RF section 22 of the wireless tag 20 sends the sequence number SEQ to the reader/writer 10, and the CPU 13 of the reader/writer 10 generates the MAC value W=MAC (KS, S_PAD=m, SEQ=X, D) (first encryption data) using the value based on the sequence number SEQ sent from the wireless tag 20 and the writing target data D which is written into the memory section 24 of the wireless tag 20.

Furthermore, the RF section 12 of the reader/writer 10 sends to the MAC value W and the writing target data D to the wireless tag 20, and the RF section 22 of the wireless tag 20 receives the MAC value W and the writing target data D.

In addition, the command sequencer section 23 of the wireless tag 20 generates the MAC value W'=MAC (KS, S_PAD=m, SEQ=X, D) (second encryption data) using the value based on the sequence number SEQ (sent to the reader/writer 10) and the writing target data D which is received by the RF section 22.

Then, the command sequencer section 23 of the wireless tag 20 writes the writing target data D received by the RF section 22 into (the target unit of) the memory section and updates the sequence number SEQ (in the target unit) stored in the memory section 24 only when the MAC values W' and W match.

Accordingly, it is possible for the wireless tag 20 to perform authentication of whether or not the reader/writer 10 is a legitimate device by comparing the MAC values W' and W, and furthermore, in the case when the authentication is successful, it is possible to write the writing target data D into the memory section 24.

As a result, in regard to the wireless tag 20, it is possible to ensure security, that is, to prevent fraudulent rewriting of the data in the memory section 24 by a fraudulent reader/writer.

In addition, it is possible to shorten the time necessary for the reader/writer 10 to write data into the wireless tag 20 (the time from when the reader/writer 10 and the wireless tag 20 start proximity communication to when the writing target data D is written into the memory section 24) compared to a case of performing mutual authentication.

That is, in the case where mutual authentication between the reader/writer 10 and the wireless tag 20 is performed, mutual authentication is performed where two transactions are necessary, the transaction where the reader/writer 10 performs authentication of the wireless tag and the transaction where the wireless tag 20 performs authentication of the reader/writer 10, and after the mutual authentication is successful, the writing target data D is sent from the reader/writer 10 to the wireless tag 20 and written into the memory section 24 of the wireless tag 20.

On the other hand, as shown in FIG. 7, in the case where the reader/writer 10 performs authentication of the wireless tag 20 using one-side authentication and the wireless tag 20 performs authentication of the reader/writer 10 by a simplified authentication method using the one-side authentication (the authentication between the reader/writer 10 and the wireless tag 20 in this manner is referred to blow as simplified authentication), the writing target data D and the MAC value W are sent from the reader/writer 10 to the wireless tag 20 after the one-side authentication by the reader/writer 10 is performed.

Then, in the wireless tag 20, the verification (comparison of the MAC values W and W') of the sequence number SEQ used in the generation of the MAC value W and the writing target data D is performed using the MAC value W, and if there are no problems with the sequence number SEQ and the writing target data D (if the MAC values W and W' match), the writing target data D is written into the memory section 24 on the basis that the writing target data D has not been tampered with and the authentication of the reader/writer 10 is successful.

Accordingly, since the writing target data D is sent from the reader/writer 10 to the wireless tag 20 as the data used in the authentication of the reader/writer 10 by the wireless tag 20 (and the verification of the writing target data D), it is not necessary for the writing target data D to be sent from the reader/writer 10 to the wireless tag 20 after the authentication of the reader/writer 10 by the wireless tag 20 is successful.

As such, in the simplified authentication, it is possible to shorten the time necessary for the reader/writer 10 to write data into the wireless tag 20 compared to the case where the writing target data D is sent from the reader/writer 10 to the wireless tag 20 after the mutual authentication is successful.

In addition, since the sequence number SEQ used in the generation of the MAC values W and W' updates a value regularly each time data is written into the memory section 24 of the wireless tag 20, even if there is eavesdropping of the MAC value W which is sent from the reader/writer 10 to the wireless tag 20 and a replay attack is performed with regard to the wireless tag 20 using the MAC value W, the MAC value W used in the replay attack does not match with the MAC value W' generated using the sequence number SEQ after updating in the wireless tag 20.

Accordingly, it is possible to prevent replay attacks.

In addition, in FIG. 7 (and in the same manner in FIG. 8 described later), the session key KS, the unit number S_PAD=m of the target unit, the sequence number SEQ=X, and the writing target data D are used in the generation of the MAC values W and W', but it is possible to generate the MAC values W and W' using the session key KS, the sequence number SEQ=X, and the writing target data D without using the unit number S_PAD=m of the target unit.

However, also using the unit number S_PAD=m of the target unit, by generating the MAC values W and W', it is possible to prevent tampering with the unit number S_PAD=m from the outside, that is, the fraudulent changing of the writing destination unit where the writing target data D is written into.

Figure 8:
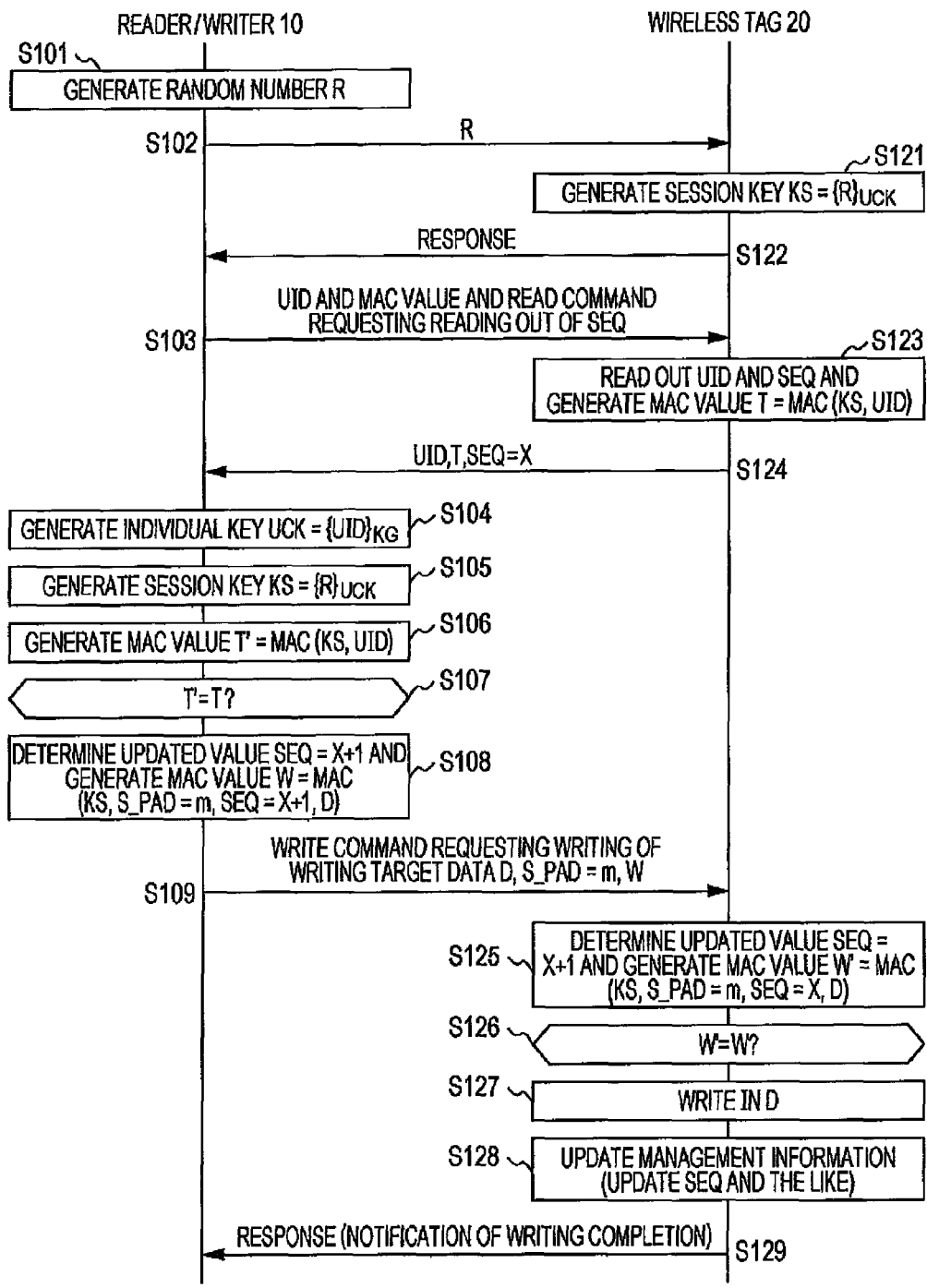
FIG. 8 is a diagram describing processing of the reader/writer and the wireless tag in a case where the reader/writer performs one-side authentication and the wireless tag performs authentication of the reader/writer using the one-side authentication.

FIG. 8 is a diagram describing another processing of the reader/writer 10 and the simplified authentication performed by the wireless tag 20.

In the processing of the simplified authentication of FIG. 7, the sequence number SEQ=X itself is used as the value based on the sequence number SEQ used in the generation of the MAC values W and W', but as the value based on the sequence number SEQ used in the generation of the MAC values W and W', in addition, it is possible to adopt the sequence number SEQ=X+1 after updating.

However, in the case where the MAC values W and W' are generated using the sequence number SEQ=X+1 after updating, it is necessary to implement the updating rule of the sequence number SEQ, where a value is updated regularly each time data is written into the memory section 24, in the reader/writer 10 (the reader/writer 10 is made to recognize the updating rule of the sequence number SEQ).

In FIG. 8, in steps S101 to S109, the reader/writer 10 performs processing in the same manner as each of steps S51 to S59 in FIG. 7, and in steps S121 to S129, the wireless tag 20 performs processing in the same manner as each of steps S71 to S79 in FIG. 7.

However, in step S108 which corresponds to step S58 in FIG. 7, the reader/writer 10 determines the sequence number SEQ=X+1 after updating where the sequence number SEQ=X from the wireless tag 10 is updated and generates the MAC value W=MAC (KS, S_PAD=m, SEQ=X+1, D) using the sequence number SEQ=X+1 after updating instead of the sequence number SEQ=X itself.

In addition, in step S125 which corresponds to step S75 in FIG. 7, the wireless tag 20 determines the sequence number SEQ=X+1 after updating where the sequence number SEQ=X of the target unit is updated and generates the MAC value W'=MAC (KS, S_PAD=m, SEQ=X+1, D) using the sequence number SEQ=X+1 after updating instead of the sequence number SEQ=X itself.

As above, in the case where the MAC values W and W' are generated using the sequence number SEQ=X+1 after updating, even if there is eavesdropping of the sequence number SEQ=X, since it is not possible to generate the MAC value W which matches with the MAC value W' generated in the wireless tag 20 if the updating rule of the sequence number SEQ is not known, it is possible to improve security more than in the case where the MAC values W and W' are generated using the sequence number SEQ itself.

Another Embodiment of Logic Format of Memory Section 24

FIG. 9 is a diagram describing another embodiment of the logic format of the memory section 24 of the wireless tag 20 of FIG. 1.

The logic format of FIG. 9 has that a portion of the memory region of the memory section 24 is the one or more user blocks allocated to the service in common with the case of FIG. 2.

However, the logic format of FIG. 9 is different in that another portion of the memory region of the memory section 24 is a management block which stores the management information from the case of FIG. 2, where the management information is stored in a page (the management page).

Here, in FIG. 2, the unit is configured by a plurality of pages since it is necessary to have one or more pages which store data (data pages) and one management page in the unit, but in FIG. 9, since the management information is stored in the management block and the management page is not necessary, it is possible to configure the unit with one or more pages.

In FIG. 9, the unit is configured by one page.

Accordingly, in FIG. 9, the unit is equivalent to the page.

In addition, in FIG. 9, the data and the CRC as the error detection code of the data are stored in the unit (which is equivalent to the page) of the user block.

The management block is configured by, for example, units (or pages in FIG. 9) which number M' which is a number which is double the number of user blocks.

Accordingly, the memory section 24 is set to have one user block and the management block has two units.

The management information of each user block is stored in the management block. The management information of one user block is stored in the two units of the management block.

Here, the two units of the management block, where the management information of one user block are stored, are the two units of the management block which correspond to the user block.

Here, focusing on a certain one user block, in each of the two units (pages) of the management block which correspond to the certain user block which is focused on, the unit numbers S_PAD of the M+1 units which configure the certain user block as the management information of the certain user block, one sequence number, and the CRC as the error detection code (of the unit numbers S_PAD of the M+1 units and the one sequence number) are stored.

Here, in the two units of the management block which correspond to the certain user block, the management information of the certain user block is alternately written in after the writing of the data each time the data is written into the certain user block.

Accordingly, in one of the units out of the two units of the management block which correspond to the certain user block, the latest management information of the certain user block is stored, and in the other unit, the management information, which is from immediately before the latest management information is written in, is stored.

As above, a measure against memory corruption is possible since the latest management information of the certain user block and the management information, which is from immediately before the latest management information is written in, are stored by the management information of the certain user block being alternately written into the two units of the management block which correspond to the certain user block each time the data is written into the certain user block.

Here, the memory region, which stores the unit numbers S_PAD of the M+1 units in each of the two units (pages) of the management block which correspond to the certain user block, is divided up into M+1 memory regions (referred to below as unit number regions) which store information for specifying the unit numbers S_PAD of the M+1 units which configure the certain user block (referred to below as unit number specification information).

Then, the value m is adopted as the unit number specification information of the mth unit #m out of the M+1 units #1 to #M+1 which configure the certain user block, and in the ith unit number region from the front out of the M+1 unit number regions, the unit number specification information #m of the unit #m, where the unit number S_PAD is the value i, is stored.

Accordingly, in the case where the unit number specification information #m is stored in the ith unit number region from the front out of the M+1 unit number regions, out of the M+1 units #1 to #M+1 which configure the certain user block, the unit number S_PAD of the mth unit #m is the value i.

As above, in FIG. 9, since the unit number S_PAD of the unit #m is specified as the value i by the unit number specification information #m of the unit #m being written into the ith unit number region, in practice (equivalently), it is possible to include the unit number S_PAD #i of the unit #m in the management information.

Here, in FIG. 9, as described above, since the one sequence number SEQ is included in the management information of the certain user block, the sequence number SEQ is updated even if the data is written into either of the units of the certain user block.

That is, in FIG. 2, since there is the management information for each unit and the one sequence number SEQ is included in the management information, the sequence number SEQ which is included in the management information of a given unit is updated each time data is written into the unit.

On the other hand, in FIG. 9, since there is the management information for each user block and the one sequence number SEQ is included in the management information, the sequence number SEQ which is included in the management information of a given unit block is updated even if the data is written into either of the units of the user blocks (updated each time data is written into the user block).

Here, it is possible that only one sequence number SEQ is provided with regard to the memory section 24. In this case, the sequence number SEQ for which only one is provided with regard to the memory section 24 is updated even if the data is written into any of the units of any of the user blocks of the memory section 24.

In the case where the memory section 24 has the logic format of FIG. 9, in the same manner as the case of FIG. 2, the command sequencer section 23 performs control of the writing of the data to the memory section 24.

That is, for example, immediately before the writing of the data is performed (before writing), out of the M+1 units #1 to #M+1 of the certain user block, for example, the M+1th unit #M+1 is the buffer unit and the 1st to the Mth units #1 to #M are data units.

In addition, the unit number S_PAD of the data unit #m is set as the value m and the sequence number SEQ (which is included in the management information) of the certain user block is set as the value X.

Then, here, for example, the write command, which requests the writing of data to the unit where the unit number S_PAD (of the certain user block) is the value 1, is sent with the data from the reader/writer 10 to the wireless tag 20.

In this case, the command sequencer section 23 writes the data sent with the write command into the unit #M+1 which is the buffer unit and not into the target unit which is the unit which is the target where writing is to be performed, that is, not the unit #1 where the unit number S_PAD has a value 1 (the unit with the unit number S_PAD where writing is requested by the write command) in accordance with the write command from the reader/writer 10.

After that, the command sequencer section 23 updates the management information of the certain user block.

That is, as the management information of the certain user block, the latest management information (referred to below as the latest management information) and the management information, which is from immediately before the latest management information is written in (referred to below as the previous management information), are stored in the memory section 24 as described above.

Here, management information C#t is set to be stored as the latest management information of the certain user block and management information C#t−1 is set to be stored as the previous management information of the certain user block in the memory section 24.

The command sequencer section 23 updates the management information C#t so that the unit number S_PAD of the unit #M+1 which is the buffer unit is set to the unit number S_PAD=1 which is the same as the unit number S_PAD=1 of the unit #1 which is the target unit and the unit number S_PAD of the unit #1 which is set as the new buffer unit is set to the value 0 which indicates the buffer unit.

Furthermore, the command sequencer section 23 updates the sequence number SEQ which includes the management information C#t and calculates the new error detection code.

Then, when the management information which is obtained as a result of the above is set to indicate management information C#t+1, the command sequencer section 23 performs writing in a format where the management information C#t+1 is written over the management information C#t−1, which is the previous management information of the memory section 24, as the management information of the certain user block.

As a result, the management information C#t+1 becomes the latest management information of the certain user block and the management information C#t becomes the previous management information of the certain user block.

Here, the embodiments of the invention are not limited to the embodiments described above and various modifications are possible within the scope which does not depart from the concept of the invention.

That is, for example, in the embodiments, an EEPROM is adopted as the memory section 24 which is a non-volatile memory, but it is possible to adopt a non-volatile memory other than EEPROM such as FeRAM (Ferroelectric Random Access Memory), as the memory section 24.

In addition, in the embodiments, the buffer unit which is different from the data units is provided in the memory section 24, but the buffer unit may not be provided. However, in a case where the buffer unit is not provided, it is difficult to have a measure against memory corruption.

Here, in the mutual authentication in accordance with a symmetrical cipher algorithm, the reader/writer sends a specialized authentication command which is a specialized command for performing of processing such as making the wireless tag generate the random number and send the encryption data where the random number is encrypted to the reader/writer.

Accordingly, it is necessary that the wireless tag interpret such a specialized authentication.

In addition, in the case where the mutual authentication in accordance with a symmetrical cipher algorithm is performed, data is encrypted using the encryption key generated using the random number and exchanged between the reader/writer and the wireless tag so as to prevent eavesdropping after the mutual authentication.

Since there is also decryption of the data in the case where the data is encrypted and exchanged, it is necessary to have a separate command in a case where the data is exchanged without being decrypted (in plain text).

That is, a specialized encryption read command and write command for performing the exchange of data where the data is decrypted is necessary as well as the normal read command and write command for performing the exchange of data where the data is not decrypted in the case where the data is encrypted and exchanged.

With regard to this, since the data is exchanged between the reader/writer 10 and the wireless tag 20 in plain text without performing the mutual authentication in accordance with a symmetrical cipher algorithm, the specialized authentication command and the specialized encryption read command and write command are not necessary.

Accordingly, it is possible to reduce the number of commands to be interpreted by the wireless tag 20, and as a result, as the command sequencer section 23 of the wireless tag 20, it is possible to adopt a PLC (Programmable Logic Controller) and not a high-level processor such as a CPU.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
 a communication circuit which performs proximity communication with a reader/writer;
 a memory which stores data and a sequence number where a value is updated regularly each time data is written into the memory; and
 a control device which controls the writing of the data to the memory in accordance with a command from the reader/writer,
 wherein the communication circuit sends the sequence number stored in the memory to the reader/writer and receives first encryption data, which is generated by the reader/writer using a value based on the sequence number and writing target data which is target data which is written into the memory, and the writing target data from the reader/writer, and the control device generates second encryption data using the value based on the sequence number and the writing target data which is received by the communication circuit, writes the writing target data which is received by the communication circuit into the memory, and updates the sequence number stored in the memory in a case where the first encryption data and the second encryption data match, wherein the reader/writer generates a random number and sends the random number to the communication device, the communication circuit receives the random number sent from the reader/writer, the control device generates a session key used in the session with the reader/writer using an individual key which is unique to the communication device which is generated using distinguishing information which distinguishes the communication device and the random number received by the communication circuit, and generates third encryption data using the distinguishing information and the session key, the communication circuit sends the distinguishing information and the third encryption information to the reader/writer, and the reader/writer generates the individual key using the distinguishing information sent from the communication circuit, generates the session key using the individual key and the random number, generates fourth encryption data using the distinguishing information sent from the communication circuit and the session key, performs one-side authentication which authenticates the communication device by comparing the third encryption data and the fourth encryption data, and sends the first encryption data and the writing target data to the communication device in a case where the one-side authentication is successful.

2. A communication device comprising:

a communication circuit which performs proximity communication with a reader/writer;

a memory which stores data and a sequence number where a value is updated regularly each time data is written into the memory; and a control device which controls the writing of the data to the memory in accordance with a command from the reader/writer, wherein the communication circuit sends the sequence number stored in the memory to the reader/writer and receives first encryption data, which is generated by the reader/writer using a value based on the sequence number and writing target data which is target data which is written into the memory, and the writing target data from the reader/writer, the control device generates second encryption data using the value based on the sequence number and the writing target data which is received by the communication circuit, writes the writing target data which is received by the communication circuit into the memory, and updates the sequence number stored in the memory in a case where the first encryption data and the second encryption data match, wherein a portion of a storage region of the memory is a user block which is a storage region of the smallest unit which is possible to be allocated to a service, the user block has a plurality of units, the units have one or more pages which are pages which are storage regions of predetermined units where writing is performed, one unit out of the plurality of units which configure the user block is a buffer unit which functions as a buffer which buffers the data written into the user block, the memory stores management information for managing the storage region of the memory, the management information includes a unit number which specifies the unit, and the control device performs writing of data to a target unit by writing the unit number of the target unit, which is a unit which is a target for data to be written into, as the unit number of the buffer unit and sets the target unit as a new buffer unit.

3. The communication device according to claim 2, wherein the unit is configured to have one page, another portion of the storage region of the memory is a management block which stores the management information of each of the user blocks, the management information of the user block includes the unit numbers of each of the plurality of units of the user block and one sequence number, and the control device updates the one sequence number which is included in the management information of the user block which has the unit where the writing target data is written into.

4. The communication device according to claim 2, wherein the unit is configured by a plurality of pages, one page out of the plurality of pages of one unit is a management page which stores the management information of each of the units, the management information of the unit includes the unit number of the unit and one sequence number, and the control device updates the one sequence number included in the management information of the unit where the writing target data is written in.

5. The communication device according to claim 2, wherein the first encryption data and the second encryption data are generated using the value based on the sequence number, the writing target data, and the unit number of the target unit.

\* \* \* \* \*